Dec. 2, 1969  R. T. CASEBOLT ET AL  3,481,572
PANEL MOUNTING BRACKET
Filed July 20, 1967  2 Sheets-Sheet 1
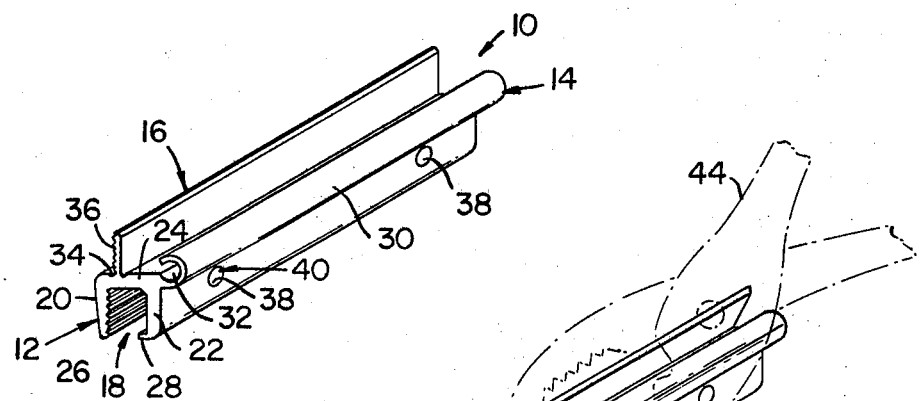
FIG_1
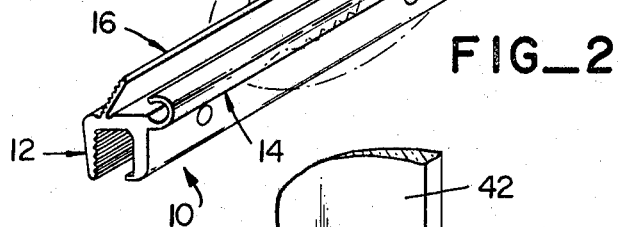
FIG_2
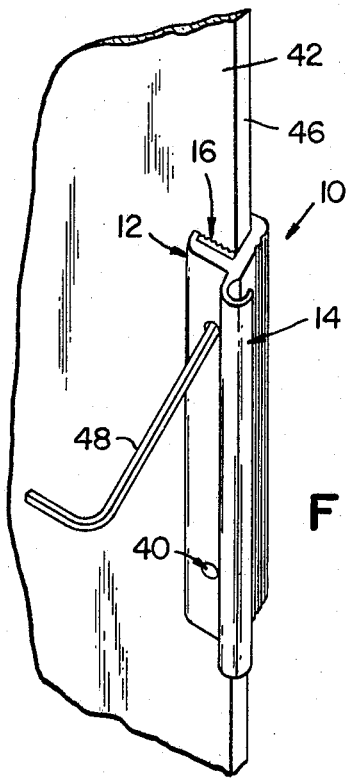
FIG_4
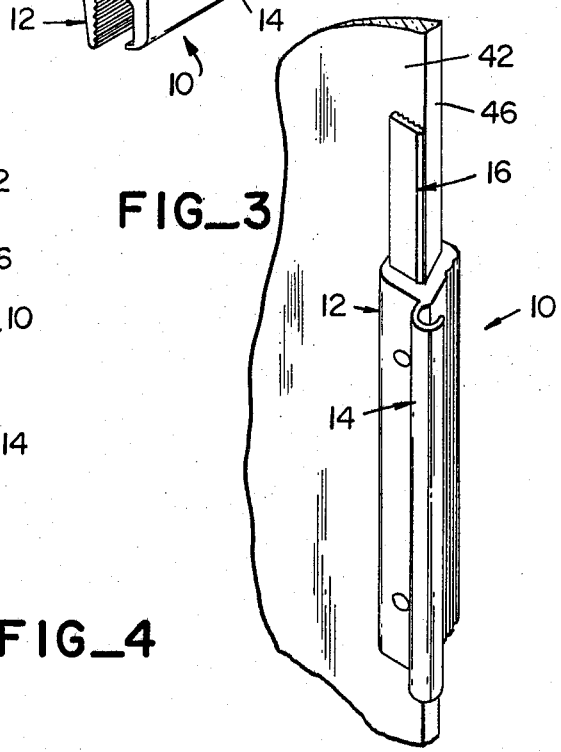
FIG_3
INVENTORS
RALPH T. CASEBOLT
BY ARNOLD O. RYSTAD
*Townsend and Townsend*
ATTORNEYS

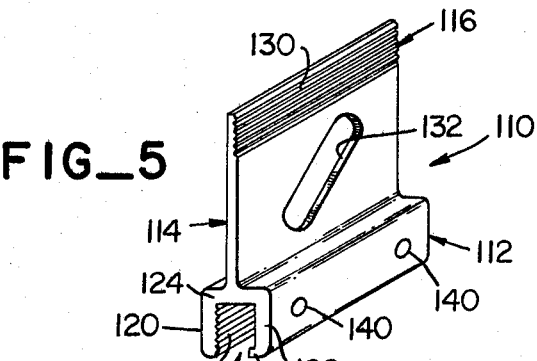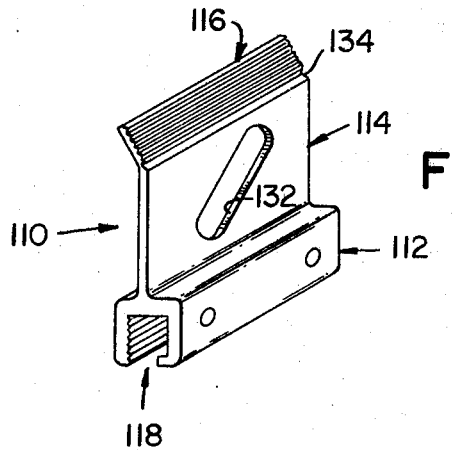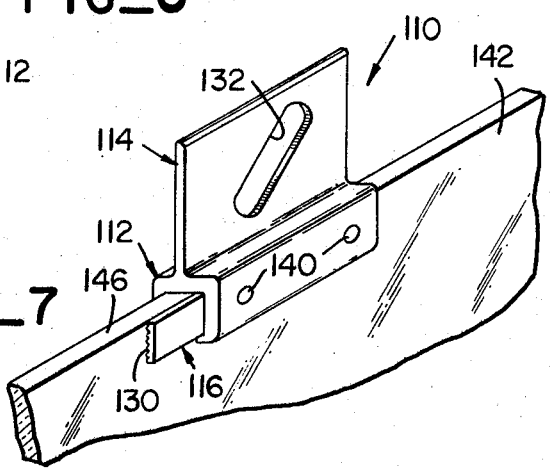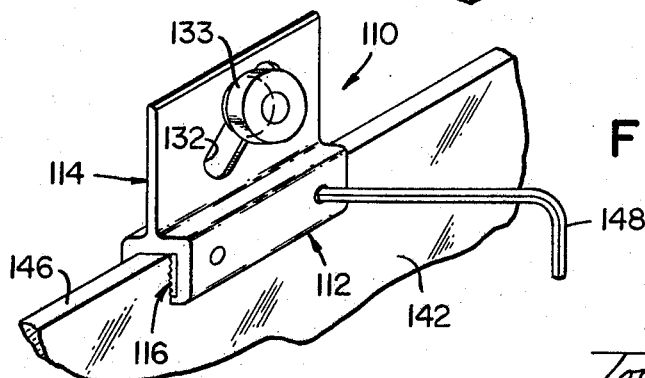

United States Patent Office 3,481,572
Patented Dec. 2, 1969

3,481,572
PANEL MOUNTING BRACKET
Ralph T. Casebolt, Oakland, and Arnold O. Rystad, Alameda, Calif., assignors to Agalite Bronson Company, Oakland, Calif.
Filed July 20, 1967, Ser. No. 654,757
Int. Cl. E05d *15/54*
U.S. Cl. 248—226                         13 Claims

ABSTRACT OF THE DISCLOSURE

A mounting bracket for a panel wherein the bracket is comprised of a channel section, a mounting section, and a bearing element integral with and separable from the channel and mounting sections. When the bearing element is separated, it is inserted in the channel section and means is provided to force the bearing element against one surface of a panel margin received in the channel section whereby the bracket is coupled to the panel. The mounting bracket can be used for suspending the panel or for hingedly mounting the same along one side edge.

---

This invention relates to improvements in the mounting of a panel and, more particularly, to a mounting bracket for a sliding or swinging door.

The present invention is directed to a panel mounting bracket having a configuration permitting an extension of the bracket to define a bearing element which is separable from the remaining part of the bracket and insertible into a channel formed in the bracket. Force-applying means on the bracket are disposed to urge the bearing element against a side margin of a panel received in the channel, whereby the bearing element will frictionally engage the panel to thereby couple the bracket to the panel itself.

The invention is especially adapted for use with frameless panels of the tempered glass type wherein the panel is suspended from its upper edge to provide a sliding door or is hinged along one side edge to provide a swinging door. Frameless tempered glass panels are extremely well suited for shower doors because of their high strength characteristics and their resistance to the build-up of stresses due to temperature differentials on opposed faces. To utilize tempered glass for this purpose, the panels must be cut before they are tempered inasmuch as it is extremely impractical to cut the panels to size at the job site. Thus, stock sizes of the panels are generally provided and it is important that means be provided to compensate for errors in the mounting structure for the panels since the panels cannot be cut at the job site.

The present invention provides a mounting bracket which can compensate for such errors and, at the same time, provides a positive mounting means for the panel. The present bracket eliminates the need for adhesive which ordinarily have been used in the past to attach mounting brackets to tempered glass panels. To this end, the bracket has the bearing element which is receivable in the channel portion of the bracket and serves to bear against one side of the panel margin received in the channel portion to grip the panel and thereby attach the bracket thereto.

The bracket can be formed by extrusion techniques so that individual brackets can be cut from a relatively long length. Moreover, the bracket can remainn intact, i.e., with the bearing element integral therewith, until ready for use. It is a simple matter to separate the bearing element from the rest of the bracket so that the bearing element can be inserted in place in the channel portion.

It is the primary object of this invention to provide a mounting bracket for a panel wherein the bracket has an extension integral therewith which can be separated therefrom and used as a bearing element against one side of a panel to be mounted in gripping relationship to the panel whereby the bracket will be effectively coupled to the panel for mounting.

Another object of this invention is to provide a bracket of the type described which can be used for suspending a panel from its top edge or for hingedly mounting the panel along one side edge thereof.

Still another object of this invention is to provide a panel mounting bracket of the aforesaid character wherein the bracket can be made by extrusion techniques to minimize the costs of production and to assure that the extension or bearing element will be simultaneously formed with the rest of the bracket and will remain attached thereto until ready for use.

Other objects of this invention will become apparent as the following specification progresses, reference being had to the accompanying drawings which illustrate preferred embodiments of the bracket.

In the drawings:

FIG. 1 is a perspective view of one embodiment of the bracket adapted for use as a hinge;

FIG. 2 is a view similar to FIG. 1 but illustrating the way in which the extension or bearing element is removed from the rest of the bracket by a tool;

FIG. 3 is a perspective view of the bracket mounted on one side edge of a panel, with the bearing element being inserted in the bracket adjacent to the panel;

FIG. 4 is a view similar to FIG. 3 and illustrating the way in which the bearing element is forced against the panel to grip the same;

FIG. 5 is a perspective of a second embodiment of the bracket for suspending a panel;

FIG. 6 is a view similar to FIG. 5 but showing the way in which the extension or bearing element is separated from the rest of the bracket;

FIG. 7 is a perspective view of the bracket mounted on the upper edge of a panel with the extension or bearing element being inserted in the channel portion of the bracket; and FIG. 8 is a view similar to FIG. 7 but illustrating the way in which the bearing element is forced against the panel to grip the same.

The first embodiment of the panel mounting bracket is broadly denoted by the numeral 10 and is illustrated in FIGS. 1–4. Bracket 10 includes a channel section 12, a mounting section 14, and an extension 16 integral with and separable from section 12. Extension 16 defines a bearing element which, when separated from section 12, is inserted in the channel 18 thereof for bearing against one side of a panel to be mounted by the bracket. This will be explained hereinafter.

Section 12 includes a pair of spaced sides 20 and 22 and a bight 24 which define channel 18. The inner surface of side 20 is serrated to provide longitudinally-extending teeth 36. Side 22 has an elongated projection 24 defining a shoulder which extends laterally into channel 18.

Section 14 may be of any construction but, for purposes of illustration, it includes a transversely arcuate stretch 30 which essentially is cylindrical to define a pin-receiving passage 32. Stretch 30 is integral at one end thereof to the junction between the side 22 and bight 24 although the stretch can be mounted elsewhere on section 12 if desired.

Bearing element 16 is integral with bight 24 along a line of weakness defined by a longitudinally-extending groove 34. One face of bearing element 16 is serrated to provide a number of longitudinally-extending teeth 36.

Sections 12 and 14 and bearing element 16 can be formed by an extrusion process inasmuch as they are integral with each other and are configured to permit them to be extruded. In this way, a number of brackets 10 can be cut from a length of the extrusion, the length of each bracket depending upon the particular application to which it is placed. Also, bearing element 16 can remain attached to the rest of the bracket until it is ready for use at the job site.

Side 22 is provided with a pair of spaced holes 38 therethrough which are internally threaded to receive set screws 40 having inner ends which project into channel 18.

To place bracket 10 in condition for use on a panel 42, bearing element 16 is separated from section 12 in any suitable manner, such as by a pair of pliers 44 in the manner shown in FIG. 2. The pliers apply a lateral force to bearing element 16 so that it will be caused to pivot about groove 34. This movement fatigues the material at the junction between section 12 and element 16 to the point where the element can be actually severed from section 12.

Holes 38 can be drilled and tapped at any time prior to use. Preferably, this is done after the brackets have been cut to size and before being sent to a job site.

The bracket is placed on one side edge 46 of panel 42 with the adjacent margin received within channel 18. The extent to which the panel extends into the channel will depend upon how the panel must be hung with respect to other structure. However, bracket 10 allows for errors in the adjacent structure of the panel assembly inasmuch as the panel margin need not extend all the way into channel 18.

With bracket disposed on panel 42, bearing element 16 is inserted into the channel and is effectively guided by shoulder 28 in the manner shown in FIG. 3. Teeth 36 are in facing relationship to the panel and are disposed to "bite" into the panel when the bearing element is forced against the latter.

After the bearing element is completely inserted into the channel, a suitable tool 48 is used to urge the inner ends of screws 40 against the outer face of bearing element 16 whereupon the bearing element will be forced into frictional engagement with one side of the panel and the panel will in turn be forced against the teeth 26 of side 20. The bracket will then be firmly and releasably held in place on the panel. When this occurs, the bracket can then be used for hingedly mounting the panel in place. It is to be noted that bracket 10 can be positioned at any location on the corresponding side margin of the panel. In this way, it can compensate for errors in the remaining portion of the hinge mounting structure associated with hinge section 14.

The second embodiment of the invention is shown in FIGS. 5–8 and is adapted for use in suspending a panel 142 whereby the panel can be used as a sliding door. The bracket of this embodiment is denoted by the numeral 110 and includes a channel section 112, a mounting section 114, and an extension 116 defining a bearing element in the same manner as extension 16 of the first embodiment.

Section 112 is essentially the same construction as section 12 and includes sides 120 and 122 which, with a bight 124, define a channel 118 for receiving the top margin 146 of a panel 142. Teeth 126 on the inner surface of side 120 are used to "bite" the panel and thereby assure a good grip on the panel. Set screws 140 are threadedly coupled to side 122 for the same purpose as screws 40.

Mounting section 114 comprises a generally flat plate having an angularly disposed slot 132 therethrough which is to be used for connecting section 114 to rigid mounting structure. For purposes of illustration, a roller 133 is adjustably coupled to section 114 with the shaft of the roller extending through slot 132. The opposite end of the shaft is releasably held in place, such as by nuts or the like whereby the roller may be adjusted along the length of the slot to properly position the panel for sliding movement.

Bearing element 116 is integral with the outer margin of section 114 and is separable therefrom by virtue of a line of weakness defined by a longitudinal groove 134 at the junction between section 114 and element 116.

Bracket 110, like bracket 10, can be formed from an extrusion process and the extrusion can be cut to size to produce a number of the brackets. Channel section 112 can be drilled and tapped to provide mounting means for screws 40, whereupon the bracket can then be shipped to a job site during which time bearing element 116 remains integral with the rest of the bracket.

When it is to be used, bearing element 116 is separated from section 114 in any suitable manner, such as by a tool in the manner shown in FIG. 2. A roller 133 will have been mounted on section 114 so that panel 146 can be shiftably mounted when bracket 110 is coupled thereto.

After the separation of bearing element 116, the margin 146 of panel 142 is received in channel 118 followed by the insertion of bearing element 116 into the channel and onto a shoulder 128 extending laterally from side 122. Screws 140 are then tightened by a tool 148 to force the bearing element against the panel and teeth 130, formed by serrating one side face of element 116, "bite" into the panel. Screws 140 forces the bearing element against the panel and thereby force the latter against the opposite side 120. In this way, the bracket is firmly and releasably held in place on the upper edge of panel 142. The position of the bracket can be adjusted so as to compensate for any errors in the positioning of mounting structure which is to be used along with bracket 110.

The present invention provides a mounting bracket which can quickly and easily be attached to structure to be mounted and which can be formed as a one-piece unit even though, when in use, it comprises a two-piece construction. The invention eliminates the need for adhesives and can readily compensate for errors in the dimensions of the structure with which it is associated.

While two embodiments of the invention have been shown and described, it will be apparent that other adaptations and modifications can be made without departing from the true spirit and scope of the invention.

What is claimed is:

1. A panel bracket comprising: a generally rigid body having an elongated, panel-receiving channel; an elongated bearing element integral with an projecting outwardly from said body externally of said channel, said bearing element being separable from said body and insertible in said channel adjacent to one side thereof; and means carried by said body for forcibly urging the bearing element against a panel when the latter and said bearing element are disposed in the channel, whereby the body is coupled to said panel.

2. A panel bracket as set forth in claim 1, wherein is provided shoulder means on said body on one side of said channel for at least partially supporting said bearing element when it is initially inserted into the channel.

3. A panel bracket as set forth in claim 1, wherein said means includes a pair of spaced screws threadably mounted on said body on one side of the channel and having respective inner ends engageable with said bearing element.

4. A panel bracket as set forth in claim 1, wherein said bearing element is serrated on one side thereof to provide panel-engaging teeth therefor.

5. A panel bracket as set forth in claim 1, wherein said body is provided with a line of weakness at its junction with said bearing element.

6. A mounting bracket for a panel comprising: a generally rigid body having a first, transversely C-shaped section defining a channel for receiving one marginal edge portion of a panel to be mounted and a second section integral with and extending laterally from said first section for mounting the body in a predetermined position; a bearing element integral with and projecting outwardly from said body at one extremity thereof, there being a line of weakness at said extremity to permit the bearing element to be separated from the body, said channel having a width sufficient to simultaneously receive said bearing element and said marginal edge portion with the bearing element disposed adjacent to one side boundary of the channel after the bearing element has been separated from said body; and means carried by said first section for urging the bearing element against said marginal edge portion to force the latter into frictional engagement with the portion of said first section defining the opposite side boundary of said channel.

7. A mounting bracket as set forth in claim 6, wherein said second section includes a generally flat plate having an outer edge, said bearing element being substantially coplanar with said plate and integral therewith at said outer edge thereof.

8. A mounting bracket as set forth in claim 7, wherein said first section has a bight, said plate being integral with said bight and provided with an angled slot therethrough for mounting a roller thereon.

9. A mounting bracket as set forth in claim 6, wherein said first section has a bight, said bearing element being integral with said bight in spaced relationship to said second section, the latter having a transversely arcuate configuration to define a pin-receiving passage.

10. A mounting bracket for the marginal edge portion of a frameless shower door comprising: an extrusion having a first, transversely C-shaped channel section adapted to receive said marginal edge portion of the door, a second, elongated mounting section integral with said first section and extending longitudinally thereof, and a bearing element integral with one of said sections and projecting outwardly therefrom, there being a groove at the junction of said bearing element and said one section to provide a line of weakness, said extrusion being formed from a material capable of being severed at said groove to thereby permit said bearing element to be separated from said one section, said bearing element being receivable within said channel; and means on said extrusion for forcing the bearing element into engagement with said marginal edge portion when the latter is received in said channel and after said bearing element has been separated from said one section.

11. A mounting bracket for a panel comprising: a generally rigid body having a pair of spaced sides defining an elongated channel for receiving a marginal edge portion of a panel; a generally flat bearing element insertable in said channel adjacent to one side thereof, said bearing element and the opposite side of the body having inner, panel-engaging surfaces; means carried by said one side and engageable with the bearing element for urging the latter against a panel when the bearing element and the panel are disposed in said channel; and means on at least one of said inner surfaces for enhancing the frictional engagement between the panel and said one inner surface when the bearing element is urged against the panel.

12. A mounting bracket as set forth in claim 11, wherein said one inner surface is provided with serrations to define said enhancing means.

13. A mounting bracket as set forth in claim 11, wherein said opposite side and said bearing element have serrations on said inner surface thereof to define said enhancing means.

References Cited

UNITED STATES PATENTS

| | | | |
|---|---|---|---|
| 656,456 | 8/1900 | Hirsch | 248—224 X |
| 2,063,120 | 12/1936 | Plym | 52—499 X |
| 2,717,666 | 9/1955 | Morales | 16—158 |
| 2,765,138 | 10/1956 | Nelson | 248—226 |
| 3,121,261 | 2/1964 | Ritter | 52—399 |
| 3,319,384 | 5/1967 | Berg | 52—100 |

ROY D. FRAZIER, Primary Examiner

J. F. FOSS, Assistant Examiner

U.S. Cl. X.R.

52—100, 399, 499